(12) United States Patent
Feltgen

(10) Patent No.: US 8,897,637 B2
(45) Date of Patent: Nov. 25, 2014

(54) METHOD AND ARRANGEMENT FOR IDENTIFYING AT LEAST ONE OBJECT

(75) Inventor: Reinhard Feltgen, Alstorf (DE)

(73) Assignee: ADC GmbH (DE)

( * ) Notice: Subject to any disclaimer, the term of this patent is extended or adjusted under 35 U.S.C. 154(b) by 439 days.

(21) Appl. No.: 13/265,247

(22) PCT Filed: Apr. 22, 2009

(86) PCT No.: PCT/EP2009/009036
§ 371 (c)(1),
(2), (4) Date: Oct. 19, 2011

(87) PCT Pub. No.: WO2010/121639
PCT Pub. Date: Oct. 28, 2010

(65) Prior Publication Data
US 2012/0039600 A1    Feb. 16, 2012

(30) Foreign Application Priority Data
Apr. 22, 2009  (DE) .......................... 10 2009 018 478

(51) Int. Cl.
*H04B 10/07* (2013.01)
*G02B 6/36* (2006.01)
*G06K 7/10* (2006.01)

(52) U.S. Cl.
CPC ................................. *G06K 7/10861* (2013.01)
USPC .................................... 398/25; 398/9; 385/76

(58) Field of Classification Search
CPC .. H04B 10/071; H04B 10/801; H04B 10/803; G02B 6/3895
See application file for complete search history.

(56) References Cited

U.S. PATENT DOCUMENTS

| | | | |
|---|---|---|---|
| 3,954,320 | A | 5/1976 | Hardesty |
| 4,721,358 | A | 1/1988 | Faber et al. |

(Continued)

FOREIGN PATENT DOCUMENTS

| | | |
|---|---|---|
| CA | 2 499 803 | 4/2004 |
| DE | 201 18 013 | 1/2003 |

(Continued)

OTHER PUBLICATIONS

International Search Report for International Application No. PCT/EP2009/009036 dated May 6, 2010.

(Continued)

*Primary Examiner* — Nathan Curs
(74) *Attorney, Agent, or Firm* — Merchant & Gould P.C.

(57) ABSTRACT

The invention relates to a method and an arrangement for identifying at least one object, wherein the object has a connection unit that can be connected to a receptacle unit of a receptacle arrangement, wherein contactless information transfer takes place between the connection unit and the receptacle unit if the connection unit is connected to the receptacle unit, wherein the contactless information transfer is realized as optical information transfer, wherein an optical signal having predetermined optical properties is generated and transmitted by at least one transmitting unit, is transferred via at least one optical transfer path and is received by at least one receiving unit, wherein an evaluation and control unit (14) connected to the receiving unit evaluates the optical properties and/or propagation time properties of the received optical signal and carries out an identification of the object by means of a comparison with stored optical properties and/or by means of a comparison with stored propagation times, wherein the transmitting unit is arranged on the connection unit side or on the receptacle unit side and the receiving unit is arranged on the connection unit side or on the receptacle unit side.

20 Claims, 2 Drawing Sheets

(56) References Cited

U.S. PATENT DOCUMENTS

| | | |
|---|---|---|
| 4,902,244 A | 2/1990 | Endo et al. |
| 4,953,194 A | 8/1990 | Hansen et al. |
| 4,968,929 A | 11/1990 | Hauck et al. |
| 4,978,310 A | 12/1990 | Shichida |
| 5,052,940 A | 10/1991 | Bengal |
| 5,107,532 A | 4/1992 | Hansen et al. |
| 5,161,988 A | 11/1992 | Krupka |
| 5,166,970 A | 11/1992 | Ward |
| 5,222,164 A | 6/1993 | Bass, Sr. et al. |
| 5,265,187 A | 11/1993 | Morin et al. |
| 5,305,405 A | 4/1994 | Emmons et al. |
| 5,353,367 A | 10/1994 | Czosnowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs |
| 5,473,715 A | 12/1995 | Schofield et al. |
| 5,483,467 A | 1/1996 | Krupka et al. |
| 5,497,444 A | 3/1996 | Wheeler |
| 5,579,425 A | 11/1996 | Lampert et al. |
| 5,671,308 A | 9/1997 | Inoue et al. |
| 5,685,741 A | 11/1997 | Dewey et al. |
| 5,712,942 A | 1/1998 | Jennings et al. |
| 5,717,810 A | 2/1998 | Wheeler |
| 5,724,467 A | 3/1998 | vandenEnden et al. |
| 5,758,003 A | 5/1998 | Wheeler et al. |
| 5,821,510 A | 10/1998 | Cohen et al. |
| 5,854,824 A | 12/1998 | Bengal et al. |
| 5,910,776 A | 6/1999 | Black |
| 6,002,331 A | 12/1999 | Laor |
| 6,116,961 A | 9/2000 | Henneberger et al. |
| 6,222,908 B1 | 4/2001 | Bartolutti et al. |
| 6,222,975 B1 | 4/2001 | Gilbert et al. |
| 6,234,830 B1 | 5/2001 | Ensz et al. |
| 6,285,293 B1 | 9/2001 | German et al. |
| 6,300,877 B1 | 10/2001 | Schannach et al. |
| 6,330,307 B1 | 12/2001 | Bloch et al. |
| RE37,489 E | 1/2002 | Anton et al. |
| 6,350,148 B1 | 2/2002 | Bartolutti et al. |
| 6,409,392 B1 | 6/2002 | Lampert et al. |
| 6,421,322 B1 | 7/2002 | Koziy et al. |
| 6,424,710 B1 | 7/2002 | Bartolutti et al. |
| 6,437,894 B1 | 8/2002 | Gilbert et al. |
| 6,456,768 B1 | 9/2002 | Boncek et al. |
| 6,499,861 B1 | 12/2002 | German et al. |
| 6,511,231 B2 | 1/2003 | Lampert et al. |
| 6,522,737 B1 | 2/2003 | Bartolutti et al. |
| 6,554,484 B2 | 4/2003 | Lampert et al. |
| 6,574,586 B1 | 6/2003 | David et al. |
| 6,591,051 B2 | 7/2003 | Solheid et al. |
| 6,626,697 B1 | 9/2003 | Martin et al. |
| 6,636,152 B2 | 10/2003 | Schannach et al. |
| RE38,311 E | 11/2003 | Wheeler |
| 6,682,230 B1 | 1/2004 | Demangone et al. |
| 6,725,177 B2 | 4/2004 | David et al. |
| 6,743,044 B2 | 6/2004 | Musolf et al. |
| 6,802,735 B2 | 10/2004 | Pepe et al. |
| 6,808,116 B1 | 10/2004 | Eslambolchi et al. |
| 6,850,685 B2 | 2/2005 | Tinucci et al. |
| 6,870,734 B2 | 3/2005 | Mertesdorf et al. |
| 6,898,368 B2 | 5/2005 | Colombo et al. |
| 6,901,200 B2 | 5/2005 | Schray |
| 6,905,363 B2 | 6/2005 | Musolf et al. |
| 6,932,517 B2 | 8/2005 | Swayze et al. |
| 6,971,895 B2 | 12/2005 | Sago et al. |
| 6,976,867 B2 | 12/2005 | Navarro et al. |
| 7,081,808 B2 | 7/2006 | Colombo et al. |
| 7,088,880 B1 | 8/2006 | Gershman |
| 7,099,550 B1 | 8/2006 | Too |
| 7,123,810 B2 | 10/2006 | Parrish |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,210,858 B2 | 5/2007 | Sago et al |
| 7,226,217 B1 | 6/2007 | Benton et al. |
| 7,234,944 B2 | 6/2007 | Nordin et al. |
| 7,297,018 B2 | 11/2007 | Caveney et al. |
| 7,312,715 B2 | 12/2007 | Shalts et al. |
| 7,315,224 B2 | 1/2008 | Gurovich et al. |
| 7,352,289 B1 | 4/2008 | Harris |
| 7,356,208 B2 | 4/2008 | Becker |
| 7,370,106 B2 | 5/2008 | Caveney |
| 7,458,517 B2 | 12/2008 | Durrant et al. |
| 7,479,032 B2 | 1/2009 | Hoath et al. |
| 7,519,000 B2 | 4/2009 | Caveney et al. |
| 7,552,872 B2 | 6/2009 | Tokita et al. |
| 7,570,860 B2 | 8/2009 | Smrha et al. |
| 7,570,861 B2 | 8/2009 | Smrha et al. |
| RE41,460 E | 7/2010 | Wheeler |
| 7,869,426 B2 | 1/2011 | Hough et al. |
| 7,872,738 B2 | 1/2011 | Abbott |
| 7,873,252 B2 | 1/2011 | Smrha et al. |
| 7,873,253 B2 | 1/2011 | Smrha et al. |
| 7,965,186 B2 | 6/2011 | Downie et al. |
| 8,264,366 B2 | 9/2012 | Chamarti et al. |
| 2002/0081076 A1 | 6/2002 | Lampert et al. |
| 2004/0052471 A1 | 3/2004 | Colombo et al. |
| 2004/0117515 A1 | 6/2004 | Sago et al. |
| 2004/0240807 A1 | 12/2004 | Frohlich et al. |
| 2005/0249477 A1* | 11/2005 | Parrish ............... 385/139 |
| 2006/0160395 A1 | 7/2006 | Macauley et al. |
| 2006/0193591 A1 | 8/2006 | Rapp et al. |
| 2006/0228086 A1 | 10/2006 | Holmberg et al. |
| 2007/0116411 A1 | 5/2007 | Benton et al. |
| 2007/0237470 A1 | 10/2007 | Aronson et al. |
| 2008/0090450 A1 | 4/2008 | Harano et al. |
| 2008/0100456 A1 | 5/2008 | Downie et al. |
| 2008/0100467 A1 | 5/2008 | Downie et al. |
| 2008/0122579 A1* | 5/2008 | German et al. ............. 340/10.1 |
| 2008/0175532 A1 | 7/2008 | Ruckstuhl et al. |
| 2008/0175550 A1 | 7/2008 | Coburn et al. |
| 2009/0034911 A1 | 2/2009 | Murano |
| 2009/0097846 A1 | 4/2009 | Kozischek et al. |
| 2009/0166404 A1 | 7/2009 | German et al. |
| 2009/0232455 A1 | 9/2009 | Nhep |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0303421 A1 | 12/2010 | He et al. |
| 2011/0116748 A1 | 5/2011 | Smrha et al. |
| 2011/0222819 A1 | 9/2011 | Anderson et al. |

FOREIGN PATENT DOCUMENTS

| | | |
|---|---|---|
| DE | 102 44 304 | 3/2004 |
| DE | 10 2004 033 940 A1 | 2/2006 |
| EP | 1 199 586 A2 | 4/2002 |
| EP | 1 237 024 A1 | 9/2002 |
| EP | 1 467 232 A1 | 10/2004 |
| EP | 1 662 287 A1 | 5/2006 |
| GB | 2 236 398 A | 4/1991 |
| JP | 7-94242 | 4/1995 |
| WO | WO 98/32249 | 7/1998 |
| WO | WO 00/72074 A1 | 11/2000 |
| WO | WO 02/086573 A1 | 10/2002 |
| WO | WO 2007/061490 A2 | 5/2007 |
| WO | WO 2010/001400 A1 | 1/2010 |
| WO | WO 2010/121639 A1 | 10/2010 |

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

(56) References Cited

OTHER PUBLICATIONS

*Intelligent patching systems carving out a 'large' niche*, Cabling Installation & Maintenance, vol. 12, Issue 7, Jul. 2004 (5 pages).
*intelliMAC: The intelligent way to make Moves, Adds or Changes*! NORDX/CDT © 2003 (6 pages).
International Search Report and Written Opinion for PCT/US2010/052882 mailed Mar. 8, 2011 (23 pages).
International Search Report and Written Opinion mailed Sep. 19, 2011 in related Application No. PCT/US2011/024649 (27 pages).
International Search Report and Written Opinion mailed May 23, 2011 in related Application No. PCT/US2011/024650 (17 pages).
International Search Report and Written Opinion mailed Sep. 12, 2011 in related Application No. PCT/US2011/024652 (28 pages).
International Search Report and Written Opinion mailed Sep. 22, 2011 in related Application No. PCT/US2011/024653 (25 pages).
Invitation to Pay Additional Fees with Partial International Search for PCT/US2010/052882 mailed Jan. 4, 2011.
Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).
Partial International Search and Invitation to Pay Additional Fees mailed Jun. 8, 2011 in related Application No. PCT/US2011/024649 (8 pages).
Partial International Search and Invitation to Pay Additional Fees mailed Jun. 16, 2011 in related Application No. PCT/US2011/024652 (9 pages).
Partial International Search and Invitation to Pay Additional Fees mailed May 19, 2011 in related Application No. PCT/US2011/024653 (6 pages).
RiT SMART Cabling System, brochure from RiT Technologies, Ltd., © 2007 (8 pages).
*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.
TrueNet; TFP Series Rack Mount Fiber Panels, Spec Sheet; May 2008; 8 pages.

* cited by examiner

METHOD AND ARRANGEMENT FOR IDENTIFYING AT LEAST ONE OBJECT

This application is a National Stage Application of PCT/EP2009/009036, filed 16 Dec. 2009, which claims benefit of Ser. No. 10 2009 018 478.3, filed 22 Apr. 2009 in Germany and which applications are incorporated herein by reference. To the extent appropriate, a claim of priority is made to each of the above disclosed application.

BACKGROUND

The invention relates to a method and an arrangement for identifying at least one object by means of contactless information transfer.

The localization and identification of electrical devices or electronic equipment, by way of example, is difficult particularly when a large number of such devices are present within a facility, such as in a hospital, for example. Various approaches for localization and identification have been developed on the basis of this problem. One known approach is inventory control with the aid of inventory lists managed in written fashion. What is disadvantageous in this case is that managing these inventory lists is very labor-intensive and the inventory lists cannot be used to monitor the inventoried objects if the objects change their position.

A further approach uses barcodes and corresponding barcode scanners in order to identify and localize electrical devices within a facility, for example. In this case, an object can be localized and identified by scanning in a corresponding barcode fitted on the object. What is advantageous is that barcode scanners are generally portable. However, difficulties in monitoring with the aid of this barcode-based system arise when a change in the position of the objects has taken place after the last scanning operation. What is likewise disadvantageous is that registering objects is sometimes associated with the labor-intensive step of finding the objects within a facility.

U.S. Pat. No. 5,910,776 presents a method and an apparatus for identifying, localizing and/or monitoring an object, wherein the object has a connection unit that is connected to a receptacle unit for at least one reason other than identifying, localizing and/or monitoring the object, wherein the identification, localization and/or monitoring comprise at least the steps of:
a) attaching a transponder to the connection unit,
b) attaching a contactless reading unit having a reading range to the receptacle unit,
c) reading information from the transponder with the aid of the reading unit if the transponder is in the reading range of the reading unit, and
d) evaluating the information read by the reading unit in order to identify, localize and/or monitor the object.

A specific problem of identification arises in the monitoring of patch panels that are required for data exchange in data networks. In this case, the data networks serve the purpose of connecting a relatively large number of workstations and/or active devices, such as e.g. telecommunication means. The data networks usually have central distribution points, often embodied as distribution cabinets. Said distribution cabinets generally comprise so-called patch panels, wherein the patch panels in turn have a plurality of patch connections, also called patch sockets. In order, then, to interconnect for example a plurality of users and/or active devices such as e.g. telephones, individual patch sockets or individual active devices are connected to a second patch socket. This is done with the aid of patch cables having so-called patch plugs at one or at both ends, which patch plugs can be plugged into a patch socket. The patch cables are generally eight-core, flexible and have a length of approximately 0.5 m to 5 m. In the case of copper cables, the plugs are generally so-called RJ45 plugs; optical fibers are fabricated with various plugs.

When the data network configuration is altered, for example when workstations are moved, it is sometimes necessary to make changes to the patch lengths. Since the patch plugs or patch cables are not individually identified, altering the patch lengths leads to problems, particularly in large data networks. Firstly, there are a large number of patch cables present, which can in part overlap. Furthermore, patch lengths that are no longer required in part may nevertheless be connected or patched. Overall, the clarity in the monitoring of patch panels thus decreases, which sometimes leads to erroneous and/or time-intensive implementations of the alterations of the patch lengths.

DE 102 44 304 B3 discloses an arrangement for monitoring patch panels at distribution points in data networks, which comprises patch cables that can be plugged into connections in the patch panels by means of plugs, wherein both plugs per patch cable are equipped with a respective transponder, which furthermore comprises readers with reader coils, wherein each connection in a patch panel is equipped with a reader coil or with a reader, and wherein the readers are data-connected to an evaluation unit. In this case, the reader/transponder system serves for identifying the patch cables. The transponders contain an individual identifier, such that each plug connection can be identified. By means of a suitable management system it can furthermore be ensured that only a specific patch cable can be plugged into a specific patch socket of the patch panel. The high structural outlay and the large space requirement prove to be disadvantageous for this arrangement. The arrangement of the reader coils, in particular, requires a very large amount of space. What is likewise disadvantageous is that starting from a specific spatial proximity, the transponders mutually influence one another and can thus lead to erroneous identifications.

SUMMARY

The invention is therefore based on the technical problem of providing a method and an arrangement for robustly identifying objects, in particular patch cables, which permits reliable identification of the objects, wherein the arrangement does not have a large space requirement and identification errors as a result of superposition of signals are minimized.

In this case, the identification of at least one object is effected by means of contactless information transfer, wherein the object has a connection unit that can be connected to a receptacle unit of a receptacle arrangement, wherein contactless information transfer takes place between the connection unit and the receptacle unit if the connection unit is connected to the receptacle unit, wherein the contactless information transfer is realized as optical information transfer, wherein an optical signal having predetermined optical properties is generated and transmitted by at least one transmitting unit, is transferred via at least one optical transfer path and is received by at least one receiving unit, wherein an evaluation and control unit connected to the receiving unit evaluates the optical properties and/or propagation time properties of the received optical signal and carries out an identification of the object by means of a comparison with stored optical properties and/or by means of a comparison with stored propagation times, wherein the transmitting unit is arranged on the connection unit side or on the receptacle unit side and the receiving unit is arranged on the connection unit side or on the receptacle unit side. The use of optical information transfer advantageously has the effect that no incorrect identifications arise from the superposition of a plurality of transmitter or transponder signals, since optical signals can generally be transferred with a fixedly defined orientation.

In one advantageous embodiment, an optical transfer path influences the predetermined optical properties and/or the propagation time of the optical signal in a predetermined manner, wherein an influencing of the optical properties comprises the influencing of the intensity and/or the polarization and/or the spectral properties of the optical signal. As a result of this, a connection unit can be identified by means of the alteration of the optical properties and/or an analysis of the propagation time.

In a further embodiment, at least one transmitting unit and at least one receiving unit are arranged on the receptacle unit side and the connection unit comprises an identification unit, wherein the optical signal is transferred via a transmission path from the transmitting unit to the identification unit and via a reception path from the identification unit to the receiving unit, wherein at least the identification unit influences the optical properties and/or the propagation time properties of the optical signal. This advantageously makes it possible for exclusively passive, optical elements to be required on the connection unit side.

In a further embodiment, the receptacle unit comprises an identifying unit, wherein the optical signal is transferred via a first partial transmission path from the transmitting unit to the identifying unit, via a second partial transmission path from the identifying unit to the identification unit, via a first partial reception path from the identification unit to the identifying unit and via a second partial reception path from the identifying unit to the receiving unit. This advantageously makes it possible for the transmitting unit not to have to be fitted in direct spatial proximity to the receptacle unit. It furthermore makes it possible for a transmitting unit to be able to transfer an optical signal to a plurality of identifying units via a plurality of first partial transmission paths.

In a further embodiment, the transmitting unit is arranged on the connection unit side and the receiving unit is arranged on the receptacle unit side, wherein the connection unit comprises an identification unit and/or the receptacle unit comprises an identifying unit, wherein the identification unit and/or the identifying unit influence the optical properties and/or propagation time properties of the optical signal. This advantageously makes it possible for the connection unit of each object to have a dedicated transmitting unit that transmits a characteristic optical signal, for example. Further degrees of freedom in the identification advantageously arise as a result of the additional influencing of the optical properties of the optical signal transmitted by the transmitting unit by the identifying unit and/or by the identification unit.

In a further advantageous embodiment, the object is embodied as a patch cable, the connection unit is embodied as a patch plug, the receptacle arrangement is embodied as a patch panel and the receptacle unit is embodied as a patch socket. This advantageously results in reliable monitoring of patch panels.

An arrangement for identifying at least one object comprises at least one object and a receptacle arrangement, wherein the receptacle arrangement has at least one receptacle unit, wherein the object has a connection unit that can be connected to the receptacle unit, wherein contactless information transfer takes place between the connection unit and the receptacle unit if the connection unit is connected to the receptacle unit, wherein the arrangement furthermore comprises at least one transmitting unit, at least one receiving unit and at least one optical transfer path, and wherein the contactless information transfer is realized as optical information transfer, wherein an optical signal having predetermined optical properties is generated and transmitted by the transmitting unit, is transferred via the optical transfer path and is received by the receiving unit, wherein an evaluation and control unit connected to the receiving unit evaluates the optical properties and/or propagation time properties of the received optical signal and carries out an identification of the object by means of a comparison with stored optical properties and/or by means of a comparison with stored propagation times, wherein the transmitting unit is arranged on the connection unit side or on the receptacle unit side and the receiving unit is arranged on the connection unit side or on the receptacle unit side.

In a further embodiment, the arrangement comprises at least one optical transfer path which influences the predetermined optical properties and/or the propagation time of the optical signal in a predetermined manner, wherein an influencing of the optical property comprises the influencing of the intensity and/or the polarization and/or the spectral properties of the optical signal.

In a further embodiment, at least one transmitting unit and at least one receiving unit are arranged on the receptacle unit side and the connection unit comprises an identification unit, wherein the optical signal is transferred via a transmission path from the transmitting unit to the identification unit and via a reception path from the identification unit to the receiving unit, wherein at least the identification unit influences the optical properties and/or propagation time properties of the optical signal.

In a further embodiment, the receptacle unit comprises an identifying unit, wherein the optical signal is transferred via a first partial transmission path from the transmitting unit to the identifying unit, via a second partial transmission path from the identifying unit to the identification unit, via a first partial reception path from the identification unit to the identifying unit and via a second partial reception path from the identifying unit to the receiving unit.

In one preferred embodiment, the first partial transmission path is embodied as a first optical waveguide, which is embodied as an optical fiber or a plastic fiber or a glass fiber, and the second partial reception path is embodied as a second optical waveguide, which is embodied as an optical fiber or a plastic fiber or a glass fiber, wherein the first and second optical waveguides are embodied as a common optical waveguide or as two separate optical waveguides. The use of optical waveguides advantageously has the effect that there is not a large space requirement when an arrangement for identifying objects is integrated into e.g. existing systems.

In a further preferred embodiment, the identification unit is embodied as a film or the identification unit comprises a film which at least partly reflects the optical signal, wherein the film, by means of its arrangement and/or its properties, influences the propagation time and/or the optical properties of the optical signal. This advantageously has the effect that existing patch plugs have to be modified only little or with little outlay in order to enable the object assigned to the connection unit to be identified. Instead of a film, the identification unit can also be a glass plate and/or a lacquer and/or a surface with metal vapor-deposited thereon.

In a further embodiment, the transmitting unit is arranged on the connection unit side and the receiving unit is arranged on the receptacle unit side, wherein the connection unit comprises an identification unit and/or the receptacle unit comprises an identifying unit, wherein the identification unit and/ or the identifying unit influence the optical properties and/or propagation time properties of the optical signal.

In a further preferred embodiment, the object is embodied as a patch cable, the connection unit is embodied as a patch plug, the receptacle arrangement is embodied as a patch panel and the receptacle unit is embodied as a patch socket.

BRIEF DESCRIPTION OF THE DRAWINGS

The invention is explained in more detail below on the basis of a preferred exemplary embodiment. In the figures.

DETAILED DESCRIPTION

Figure 1:
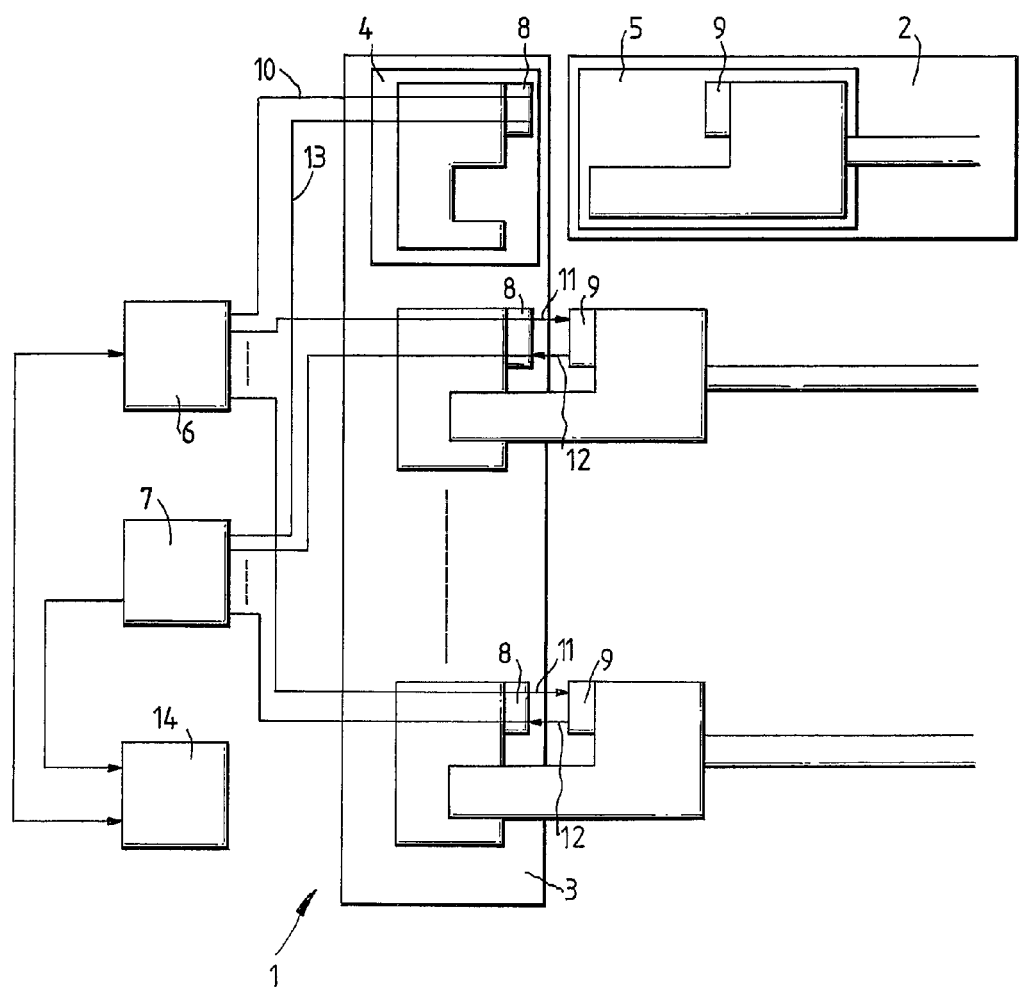
FIG. 1 shows a schematic arrangement for identifying patch cables.

FIG. 1 shows an arrangement 1 for identifying at least one patch cable 2. In this case, the arrangement 1 comprises at least one patch cable 2 and a patch panel 3, wherein the patch panel 3 has at least one patch socket 4. The patch cable 2 has a patch plug 5 that can be plugged into the patch socket 4. Once the patch plug 5 has been plugged into the patch socket 4, contactless information transfer can take place between the patch plug 5 and the patch socket 4. In this case, it is conceivable for contactless information transfer also to be able to take place if the patch plug 5 has not yet been plugged into the patch socket 4 but is situated in direct proximity to the patch socket 4. By means of an identification which in this case is effected via the contactless information transfer, it is thus possible to avoid an incorrect occupancy actually prior to plugging-in and to issue a warning signal, for example.

The arrangement 1 furthermore comprises a light source 6 and a light sensor 7. The light source 6 in this case functions as a transmitting unit and is embodied for example as a light emitting diode or as a laser. The light sensor 7 functions as a receiving unit in the arrangement 1 and is embodied for example as a light-sensitive diode or as a CCD chip. In order to enable optical information transfer between the patch socket 4 and the patch plug 5, the patch socket 4 has an identifying unit 8 and the patch plug 5 has an identification unit 9. In this case, the light source 6 is connected to the identifying units 8 via first partial transmission paths 10. In this case, the first partial transmission paths 10 are embodied for example as optical waveguides. In this case, optical waveguides can be embodied as optical fibers or plastic fibers or glass fibers. The optical signal generated by the light source 6 is transferred via the optical waveguides to all patch sockets 4 present or the assigned identifying units 8. In this case, the identifying units 8 form the interface between the first partial transmission path 10 and a second partial transmission path 11. In this exemplary embodiment, the second partial transmission path 11 comprises the medium present between the patch socket 4 and the patch plug 5. This is air in the normal case, but embodiments in which optical signal transfer takes place in a vacuum, for example, are conceivable. If the first partial transmission path 10 is embodied as an optical waveguide and the second partial transmission path 11 is embodied as air, then the identifying unit 8 can be embodied for example as a lens or as an optically defined end of the optical waveguide. Since the optical waveguide and the lens can be embodied with very small structural sizes, the structural integration of the optical information transfer or elements thereof does not require a large space requirement. The optical signal that emerges via the identifying unit 8 is transferred to the identification unit 9 via the second partial transmission path 11. In this exemplary embodiment, the optical signal is partly or else completely reflected by the identification unit 9. After reflection, the optical signal passes via a first partial reception path 12 to the identifying unit 8 again. At the identifying unit 8, a transition takes place from the first partial reception path 12, which is in turn a transfer path in air, to a second partial reception path 13. In this case, the identifying unit 8 has, analogously to the first interface, a second interface from the first partial reception path 12 to the second partial reception path 13, which is embodied for example as a lens or as an optically defined end of the optical waveguide forming the second partial reception path 13. The second partial reception path 13 is embodied analogously to the first partial transmission path 10 as an optical waveguide, which is embodied for example as an optical fiber or plastic fiber or glass fiber, and in this case connects the identifying unit 8 and the light sensor 7. In one preferred embodiment, the interfaces of the identifying unit 8 from the first partial transmission path 10 to the second partial transmission path 11 and from the first partial reception path 12 to the second partial reception path 13 are embodied as a common interface. The optical waveguide that forms the first partial transmission path 10 and the optical waveguide that forms the second partial reception path 13 are likewise embodied as a common optical waveguide. In this case, the common interface can be embodied for example as a common lens.

Figure 2:
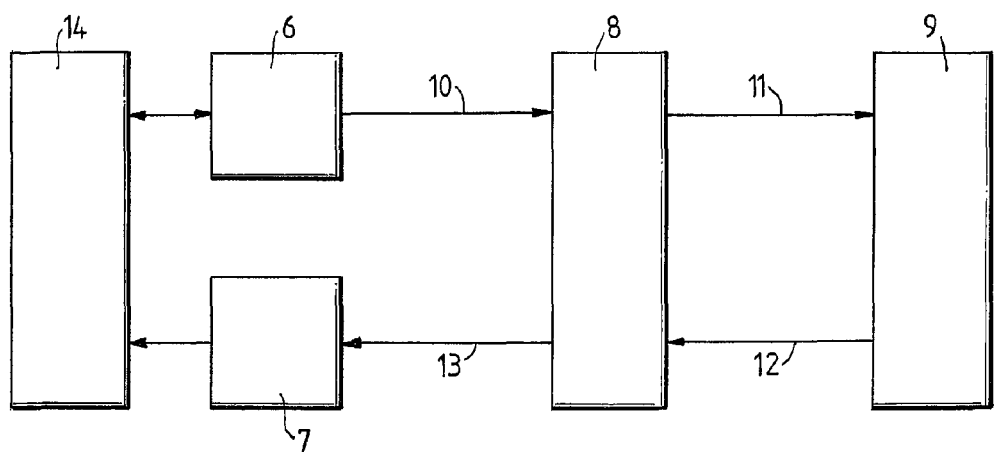
FIG. 2 shows a schematic block diagram of the optical information transfer.

As shown in FIG. 2, the first partial transmission path 10, the identifying unit 8, the second partial transmission path 11, the identification unit 9, the first partial reception path 12 and the second partial reception path 13 form an optical transfer path, wherein the first partial transmission path 10, the identifying unit 8 and the second partial transmission path 11 form the transmission path and the first partial reception path 12, the identifying unit 8 and the second partial reception path 13 form the reception path. The optical signal is transferred from the light source 6 to the light sensor 7 via the optical transfer path. The light sensor 7 converts the received optical signal into a format that permits a data-technological transfer of the optical signal to a control and evaluation unit 14. The control and evaluation unit 14 evaluates the optical properties and/or the propagation time properties of the received optical signal and compares the evaluated optical properties and/or the evaluated propagation times of the received optical signal with stored optical properties and/or stored propagation times. Preferably, the light sensor 7 simplifies the evaluation by the control and evaluation unit 14 by virtue of said light sensor emphasizing e.g. specific optical properties of the signal, for example by filtering. For evaluating the propagation time of the optical signal, the central control and evaluation unit 14 is preferably data-technologically connected to the light source 6 and controls the generation of the optical signal, for example the start time of the generation. Through knowledge of the start time, the control and evaluation unit 14 can measure the time difference between the generation of the optical signal and the reception of the optical signal. This is done by microprocessors, for example, which enable temporal resolutions in the nanoseconds range.

The evaluation of the optical properties and/or of the propagation time properties and the comparison with stored optical properties and/or propagation time properties by the control and evaluation unit 14 permit an identification of the patch cable 2. It is presupposed for this purpose that the elements of the optical transfer path influence the optical properties and/or the propagation time of the optical signal in a predetermined manner that is individual for a patch cable 2. The identification unit 9, in particular, plays an important part for this purpose since it is arranged directly at the patch plug and can thus influence the optical signal in a manner that is individual for said patch plug. The individual influencing of the optical properties by the identification unit 9 of each patch plug 5 makes it possible to identify a patch plug 5, independently of the patch socket 4 into which the patch plug 5 is plugged.

In this case, the influencing of the optical properties can be effected in various ways, which can be employed individually or else in combination. It is assumed for the following exemplary embodiments that the identification unit 9 consists of a film or comprises a film which at least partly reflects the optical signal transferred via the second partial transmission path 11. Instead of a film, the identification unit 9 can also be a glass plate and/or a lacquer and/or a surface with metal vapor-deposited thereon. The following explanations with regard to the film are therefore also analogously applicable to the other embodiments.

In a first embodiment, the film influences the intensity of the optical signal radiated in. For this purpose, it is possible to chose for example a film having fixedly defined reflection and absorption properties. It is likewise conceivable for the film to bring about an alteration of the spectral properties of the optical signal by virtue of the fact that, by way of example, predefined reflectances and/or absorptances are assigned to a likewise predefined wavelength. For this purpose, the film can be embodied for example as a color filter film or optical filter element. It is furthermore conceivable for the film to have fluorescent properties, wherein the fluorescence is excited by the optical signal radiated in. This makes it possible for a film to emit only an optical signal having a fixedly defined wavelength or a fixedly defined wavelength interval after the excitation. It is likewise conceivable to utilize an auto-fluorescence of the film, which is not excited by the optical signal radiated in. This makes it possible, in particular, to obviate the light source and the first partial transmission path 10. In a third embodiment, the film alters the polarization of the optical signal radiating in. For this purpose, the film can be embodied for example as a polarization filter film.

In addition or as an alternative, the film, by means of its arrangement and/or its construction, influences the propagation time properties of the optical signal. By means of the arrangement of the film on the patch plug 5, it is possible to vary for example the distance, and hence the optical path, between the identifying unit 8 and the film. It is thereby possible to realize different propagation times of the optical signal for different patch plugs 5. It is likewise conceivable to evaluate interference properties of the optical signal which is at least partly reflected by the film. By way of example, if the light source 6 generates a coherent optical signal having a fixedly defined wavelength, then the control and evaluation unit 14 can superpose the coherent optical signal generated by the light source 6 with the signal received by the light sensor 7. Depending on the length of the optical transfer path, interference with constructive or destructive components takes place in this case, wherein an identification can be carried out by means of an evaluation of said components. Preferably, the light source 6, for identification purposes, generates an optical signal having predetermined properties, which are then influenced by the elements of the optical transfer path.

In a further embodiment, a plurality of light sources 6 are present; in particular, each patch socket 4 can have a dedicated light source. It is likewise conceivable for more than one light sensor to be provided for the patch panel 3 to be monitored, in particular for a dedicated light sensor to be assigned to each patch socket 4. If the light sources or light sensors are in this case arranged directly at the patch sockets 4, then the first partial transmission paths 10 or the second partial reception paths 13 are advantageously obviated.

In order to provide optical radiation safety for the eyes of human operators, for example the identifying units 8 or the light sources of each patch socket 4 are arranged in such a way that the optical signal is emitted at a noncritical angle, for example, if no patch plug 5 is present. As an alternative, it is conceivable to provide covering devices or screens for the identifying units 8 or the light sources or to operate the light sources with a low intensity and/or in noncritical wavelength ranges.

It is likewise conceivable to use the optical signal that is transferred via first partial transmission paths 10 to the respective patch sockets 4 not just for the identification of the patch cable 2, but rather likewise to provide a functional signal for a human operator, for example. If e.g. a specific patch socket 4 is intended to be equipped with a patch plug 5, then the optical signal that is transferred to said patch socket 4 via the first partial transmission path 10 can have specific properties. By way of example, an indication of the desired equipping can be realized by means of flashing that an operator perceives directly at the specific patch socket 4. For this purpose it may be necessary to drive each patch socket 4 individually with an optical signal.

For the identification of patch plugs 5 in accordance with the arrangement 1 in FIG. 1 as well it is conceivable to transfer an optical signal from a light source 6 sequentially or in parallel to all patch sockets 4 coupled to the light source 6. By means of sequential identifying, the computational complexity for the evaluation in the control and evaluation unit 14 can thus be reduced since it is not necessary to simultaneously evaluate optical signals from all the patch plugs 5 present.

In a further embodiment it is conceivable for the optical signal from a light source 6 not to be transferred via first partial transmission paths 10 to the identifying units 8. The light source 6 can for example be arranged or embodied such that it illuminates one or a plurality of identification units 9. As a result, integration of optical waveguides forming the first partial transmission path 10, for example, is advantageously not required. Integration of light sources assigned to each patch socket 4 is likewise not required.

The identification unit 9 can for example also be embodied as a one-dimensional or two-dimensional barcode. In this embodiment, the identifying unit 8 has a one-dimensional or two-dimensional CCD element that images the intensities reflected from the one-dimensional or two-dimensional barcode onto pixels. In this case, the illumination of the barcodes is preferably effected by means of infrared illumination and can be realized by means of a central light source or a plurality of light sources. The use of barcodes makes it possible to realize a very large number of optical identifiers for the individual patch cables 2.

In an alternative embodiment, a light source 6 is arranged on the patch plug 5. The optical signal generated by said light source 6 is transferred for example via an identifying unit 8 and an optical waveguide to the light sensor 7 and is evaluated by an evaluation and control unit 14. This advantageously makes it possible for the light source 6 arranged on the patch plug 5 to be able to generate an optical signal having predetermined properties, wherein the optical properties of the generated signal alone suffice for identification and no further influencing of the optical properties by means of elements of the optical transfer path is necessary. It goes without saying that it is conceivable to influence the optical properties of the optical signal generated by the light source 6 arranged on the patch plug 5 by means of further elements of the optical transfer path. By way of example, it is conceivable to arrange on a patch plug 5 a lens and/or a film that influence(s) the optical signal transmitted by the light source 6 arranged on the patch plug 5 in a predetermined manner.

The control and evaluation unit 14 can furthermore be used to realize a monitoring and distribution management of the patch panels. For this purpose, it manages a database, for example, which can contain a range of information. By way of example, information such as the patch socket occupancy of all the patch panels 3 can be contained in said database. Furthermore, the information as to whether a specific patch socket 4 is occupied by a patch plug 5 can be stored in the database. The comparison data and also the measurement data for the optical properties of the film can then also be stored in the database, in which case the comparison data should be read into the database beforehand.

List Of Reference Symbols
1 Arrangement for identifying a patch cable
2 Patch cable
3 Patch panel
4 Patch socket
5 Patch plug
6 Light source
7 Light sensor
8 Identifying unit
9 Identification unit
10 First partial transmission path
11 Second partial transmission path
12 First partial reception path
13 Second partial reception path
14 Evaluation and control unit

The invention claimed is:

1. A method for identifying at least one object having a connection unit that can be connected to a receptacle unit of a receptacle arrangement, wherein contactless, optical information transfer takes place between the connection unit and the receptacle unit if the connection unit is connected to the receptacle unit, the method comprising:
  generating and transmitting an optical signal having predetermined optical properties using at least one transmitting unit, the predetermined optical properties including a predetermined polarization value;
  transferring the optical signal via at least one optical transfer path;
  receiving the optical signal with at least one receiving unit;
  evaluating properties of the received optical signal with an evaluation and control unit connected to the receiving unit, the evaluated properties including a polarization value; and
  identifying the object by comparing the polarization value with the predetermined polarization value;
  wherein the transmitting unit is arranged on a connection unit side or on a receptacle unit side and the receiving unit is arranged on the connection unit side or on the receptacle unit side.

2. The method as claimed in claim 1, wherein an optical transfer path influences a propagation time of the optical signal in a predetermined manner.

3. The method as claimed in claim 2, wherein at least one transmitting unit and at least one receiving unit are arranged on the receptacle unit side and the connection unit comprises an identification unit, wherein the optical signal is transferred via a transmission path from the transmitting unit to the identification unit and via a reception path from the identification unit to the receiving unit, wherein at least the identification unit influences the optical properties and/or the propagation time of the optical signal.

4. The method as claimed in claim 3, wherein the receptacle unit comprises an identifying unit, wherein the optical signal is transferred via a first partial transmission path from the transmitting unit to the identifying unit, via a second partial transmission path from the identifying unit to the identification unit, via a first partial reception path from the identification unit to the identifying unit and via a second partial reception path from the identifying unit to the receiving unit.

5. The method as claimed in claim 2, wherein the transmitting unit is arranged on the connection unit side and the receiving unit is arranged on the receptacle unit side, wherein the connection unit comprises an identification unit and/or the receptacle unit comprises an identifying unit, wherein the identification unit and/or the identifying unit influence the optical properties and/or the propagation time of the optical signal.

6. The method as claimed in claim 1, wherein the object is embodied as a patch cable, the connection unit is embodied as a patch plug, the receptacle arrangement is embodied as a patch panel and the receptacle unit is embodied as a patch socket.

7. An arrangement for identifying at least one object, comprising:
  a receptacle arrangement including at least one receptacle unit;
  an object including a connection unit that can be connected to the receptacle unit;
  an identification arrangement including at least one transmitting unit, at least one receiving unit, and at least one optical transfer path along which an optical signal is propagated from the transmitting unit to the receiving unit, the at least one optical path influencing propagation time properties of the optical signal in a predetermined manner; and
  an evaluation and control unit connected to the identification arrangement to evaluate propagation time properties of the optical signal received at the receiving unit and to carry out an identification of the object by a comparison of the propagation times of the received optical signal with stored propagation times,
  wherein the transmitting unit is arranged on the connection unit side or on the receptacle unit side and the receiving unit is arranged on the connection unit side or on the receptacle unit side.

8. The arrangement as claimed in claim 7, wherein the at least one optical transfer path influences the optical properties of the optical signal in a predetermined manner, wherein an influencing of the optical properties comprises the influencing of the intensity and/or the polarization and/or the spectral properties of the optical signal.

9. The arrangement as claimed in claim 8, wherein at least one transmitting unit and at least one receiving unit are arranged on the receptacle unit side and the optical transfer path includes an identification unit disposed on the connection unit, wherein the optical signal is transferred via a transmission path from the transmitting unit to the identification unit and via a reception path from the identification unit to the receiving unit, wherein at least the identification unit influences the optical properties and/or propagation time properties of the optical signal.

10. The arrangement as claimed in claim 9, wherein the receptacle unit comprises an identifying unit, wherein the optical signal is transferred via a first partial transmission path from the transmitting unit to the identifying unit, via a second partial transmission path from the identifying unit to the identification unit, via a first partial reception path from the identification unit to the identifying unit and via a second partial reception path from the identifying unit to the receiving unit.

11. The arrangement as claimed in claim 10, wherein the first partial transmission path is embodied as a first optical waveguide, which is embodied as an optical fiber or a plastic fiber or a glass fiber, and wherein the second partial reception path is embodied as a second optical waveguide, which is embodied as an optical fiber or a plastic fiber or a glass fiber, wherein the first and second optical waveguides are embodied as a common optical waveguide or as two separate optical waveguides.

12. The arrangement as claimed in claim 9, wherein the identification unit is embodied as a film or comprises a film which at least partly reflects the optical signal, wherein the film, by means of its arrangement and/or its properties, influences the propagation time and/or the optical properties of the optical signal.

13. The arrangement as claimed in claim 8, wherein the transmitting unit is arranged on the connection unit side and the receiving unit is arranged on the receptacle unit side, wherein the connection unit comprises an identification unit and/or the receptacle unit comprises an identifying unit, wherein the identification unit and/or the identifying unit influence the optical properties and/or propagation time properties of the optical signal.

14. The arrangement as claimed in claim 7, wherein the object is embodied as a patch cable, the connection unit is embodied as a patch plug, the receptacle arrangement is embodied as a patch panel and the receptacle unit is embodied as a patch socket.

15. A method for identifying at least one object having a connection unit that can be connected to a receptacle unit of a receptacle arrangement, wherein contactless, optical information transfer takes place between the connection unit and the receptacle unit if the connection unit is connected to the receptacle unit, the method comprising:
   generating and transmitting an optical signal having predetermined optical properties using at least one transmitting unit, the predetermined optical properties including a predetermined wavelength value;
   transferring the optical signal via at least one optical transfer path;
   receiving the optical signal with at least one receiving unit,
   evaluating properties of the received optical signal with an evaluation and control unit connected to the receiving unit, the evaluated properties including a wavelength value; and
   identifying the object by comparing the wavelength value with the predetermined wavelength value.

16. The method of claim 15, wherein the at least one optical transfer path includes an identifying unit disposed on a plug connector.

17. The method of claim 16, wherein the identifying unit includes a film or glass plate disposed on the plug connector.

18. The method of claim 15, wherein the evaluation and control unit also determine a propagation time for the optical signal along the optical transfer path.

19. The method of claim 15, wherein the evaluation and control unit also determine an intensity of the optical signal at the receiving unit.

20. The method of claim 15, wherein the evaluation and control unit also determine a polarization of the optical signal at the receiving unit.

* * * * *